United States Patent
Horvath et al.

(10) Patent No.: US 7,308,343 B1
(45) Date of Patent: *Dec. 11, 2007

(54) NAVIGATIONAL INSTRUMENT, METHOD AND COMPUTER PROGRAM PRODUCT FOR DISPLAYING GROUND TRAFFIC INFORMATION

(75) Inventors: Steven Horvath, Salem, OR (US); Robert C. Hilb, Anchorage, KY (US); James C. Walton, Louisville, KY (US)

(73) Assignee: Garmin AT, Inc., Salem, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/672,395

(22) Filed: Feb. 7, 2007

Related U.S. Application Data (63) Continuation of application No. 11/201,904, filed on Aug. 11, 2005, now Pat. No. 7,194,342, which is a continuation of application No. 10/690,448, filed on Oct. 21, 2003, now Pat. No. 6,957,130.

(51) Int. Cl.
 *G01D 1/00* (2006.01)
(52) U.S. Cl. ................ 701/3; 701/9; 701/14; 340/945; 340/961
(58) Field of Classification Search .............. 701/1, 701/3, 9–10, 14, 200, 300–302, 117–119; 345/5, 204, 502, 1.1, 501; 340/945, 961, 340/483
See application file for complete search history.

(56) References Cited

U.S. PATENT DOCUMENTS

| | | | |
|---|---|---|---|
| 4,283,705 A | 8/1981 | James et al. | 340/27 |
| 4,368,517 A | 1/1983 | Lovering | 364/428 |
| 5,274,387 A | 12/1993 | Kakihara et al. | 342/451 |
| 5,359,890 A | 11/1994 | Fulton et al. | 73/178 R |
| 5,420,582 A | 5/1995 | Kubbat et al. | 340/974 |
| 5,450,329 A | 9/1995 | Tanner | 263/449 |
| 5,797,106 A | 8/1998 | Murray et al. | 701/11 |
| 5,884,217 A | 3/1999 | Koyanagi | 701/208 |
| 5,945,927 A | 8/1999 | Nakayama et al. | 340/995 |
| 6,057,786 A | 5/2000 | Briffe et al. | 340/975 |
| 6,112,141 A | 8/2000 | Briffe et al. | 701/14 |
| 6,154,151 A | 11/2000 | McElreath et al. | 340/970 |
| 6,202,026 B1 | 3/2001 | Nimura et al. | 701/211 |
| 6,243,645 B1 | 6/2001 | Moteki et al. | 701/211 |
| 6,271,768 B1 | 8/2001 | Frazier, Jr. et al. | 340/961 |

(Continued)

FOREIGN PATENT DOCUMENTS

WO  WO 00/39775  7/2000

*Primary Examiner*—Yonel Beaulieu
(74) *Attorney, Agent, or Firm*—Kevin E. West; Samuel M. Korte

(57) ABSTRACT

The present invention provides an aircraft navigational system including a graphical user interface that is capable of displaying navigational information in a split-screen format. The split-screen format includes displaying multiple graphical user panels, each depicting different traffic information. For example, one of the panels displays a plurality of air traffic symbols corresponding to airborne obstacles and another of the panels simultaneously displays ground traffic symbols representing ground obstacles. The obstacles can include other aircraft in the air and on runways as the pilot's aircraft approaches for a landing. The navigational system also is capable of switching between a single graphical user panel and multiple panels in response to a triggering event, such as a change in the course of the aircraft.

20 Claims, 4 Drawing Sheets

U.S. PATENT DOCUMENTS

| | | | |
|---|---|---|---|
| 6,308,132 B1 * | 10/2001 | Wilson et al. | 701/200 |
| 6,696,980 B1 | 2/2004 | Langner et al. | 340/971 |
| 6,748,325 B1 | 6/2004 | Fujisaki | 701/301 |
| 6,832,138 B1 * | 12/2004 | Straub et al. | 701/3 |
| 6,867,711 B1 * | 3/2005 | Langner et al. | 340/979 |
| 6,868,332 B2 | 3/2005 | Hashimoto | 701/200 |
| 6,873,269 B2 | 3/2005 | Tran | 340/961 |
| 6,957,130 B1 | 10/2005 | Horvath et al. | 701/3 |

* cited by examiner

NAVIGATIONAL INSTRUMENT, METHOD AND COMPUTER PROGRAM PRODUCT FOR DISPLAYING GROUND TRAFFIC INFORMATION

RELATED APPLICATIONS

The present application is a continuation application of U.S. patent application Ser. No. 11/201,904, filed Aug. 11, 2005, now U.S. Pat. No. 7,194,342, which is a continuation application of U.S. patent application Ser. No. 10/690,448, filed Oct. 21, 2003, now U.S. Pat. No. 6,957,130 issued on Oct. 18, 2005. The above referenced applications are incorporated herein by specific reference.

BACKGROUND OF THE INVENTION

1. Field of the Invention

The present invention is related to the field of navigational instruments, and in particular, to the electronic display of navigational information for aircraft.

2. Description of Related Art

A pilot's awareness of her aircraft and its relationship to the surrounding environment is a large factor in ensuring safe flight. Originally, such information was provided by the pilot's own visual, tactile and other senses. Eventually, various devices were developed to augment the pilot's senses including compasses to determine direction, altimeters to measure altitude and Pitot tubes to determine airspeed velocity. Another example includes radar that uses radio signals to accurately indicate the location of the pilot's aircraft, ground contours and other aircraft.

Generally, more, and more accurate, information about the location and movement of the aircraft with respect to obstacles is a boon to aviation safety. As a result, navigational devices have been, and continue to be, the subject of ongoing development efforts. However, so much navigational information is now available from navigational devices that not all of the information can be effectively processed by the pilot. Therefore, presenting the information in a clear and useable manner, in addition to its volume and accuracy, has also become an important factor. Initially, presentation of the navigational information consisted of careful arrangement of various mechanical gauges, but the amount of information presented by gauges is limited due to the physical size of the gauges and the limited space on the flight deck. More recently, electronic displays have provided an alternative to gauges by allowing variation of the information presented to the pilot—typically in response to the pilot's commands.

For example, U.S. Pat. No. 6,122,141 to Briffe et al. (Briffe) discloses an aircraft navigational system. As shown in FIG. 1 of Briffe, the navigational system includes four display screens that are positioned side-by-side. The middle two display screens 18, 20 are Multi-Function Displays (MFD's) that operate independently, and that are configured to display any of a long list of aeronautical displays. Examples of the MFD displays include: (1) a horizontal situation and vertical profile screen; (2) an approach chart; (3) a GCAS display (terrain avoidance); and (4) an airport chart that graphically displays the current position of the Own ship aircraft, as shown in FIG. 9 of Briffe.

The MFD's are set up to have redundant functionality. This allows a pilot and a co-pilot to, for example, work on the same display at the same time on separate screens. In one particular example discussed in Briffe, one pilot may work on a high-altitude chart displayed on the first MFD while another pilot is working on the same high-altitude chart displayed on the second MFD. This may be useful when two pilots wish to view a particular display in different range-scales or formats.

The two, side-by-side MFD's are also configured to allow pilots to "cross-over" between the MFD's by moving a cursor on one MFD at a high rate of speed toward the other MFD. The ability to cross-over allows the user to work on either of the MFD'S. Each individual MFD can be further configured to operate in a split-screen format to display up to six different display windows on one display screen, as shown in FIG. 14 of Briffe. Despite such improvements in the amount, accuracy and presentation of navigational information, additional improvements are always desirable due to the importance of safe air travel.

Therefore, it would be advantageous to have additional navigational information that improves aircraft safety. It would be further advantageous if such navigational information were presented in a clear and useful manner to the pilot.

BRIEF SUMMARY OF THE INVENTION

The present invention addresses the above needs and achieves other advantages by providing an aircraft navigational system including a graphical user interface that is capable of displaying navigational information in a split-screen format. The split-screen format includes displaying multiple graphical user panels each depicting different traffic information. For example, one of the panels displays a plurality of air traffic symbols corresponding to airborne obstacles and another of the panels simultaneously displays ground traffic symbols representing ground obstacles. The obstacles can include other aircraft in the air and on runways as the pilot's aircraft approaches for a landing. The navigational system also is capable of switching between a single graphical user panel and multiple panels in response to a triggering event, such as a change in the course of the aircraft.

In one embodiment, the present invention includes a graphical user interface for providing air and ground traffic information to a pilot of an aircraft navigating amongst airborne and ground obstacles. The graphical user interface includes a plurality of graphical user panels. One of the graphical user panels is an air traffic graphical panel displaying a plurality of air traffic symbols each representing one of the airborne obstacles. A ground traffic graphical panel is positioned in visual proximity to the airborne traffic graphical panel. The ground traffic graphical panel displays a plurality of ground traffic symbols each representing one of the ground obstacles. At least one of the graphical panels further displays an own ship symbol representing the pilot's aircraft. The own ship symbol is positioned on the graphical panel relative to the other symbols so as to correspond to the actual, relative positions of obstacles and to the pilot's aircraft.

Examples of the obstacles include other aircraft in the air or on the ground that are within the proximity of the pilot's aircraft. The symbols can be configured to indicate a directional heading of the pilot's aircraft and the other aircraft or obstacles. For instance, an arrow or chevron symbol could be used to indicate the orientation or direction of travel of the aircraft. The graphical user panel can also display additional information associated with, and adjacent to, each of the symbols. Such additional information can include the altitude and velocity of the obstacles, as well as that of the pilot's aircraft. Optionally, the additional information may be displayed in response to another triggering event, such as touchdown of the pilot's aircraft on a runway.

In another embodiment, the present invention includes a graphical user interface for providing traffic information to a pilot of an aircraft navigating amongst obstacles. The graphical user interface includes a plurality of graphical user panels each displaying a plurality of traffic symbols. One of the graphical user panels is a ground traffic panel wherein the traffic symbols are representative of a plurality of ground obstacles and features. The graphical user panel also includes an own ship symbol representing the pilot's aircraft. The own ship symbol may be positioned on the ground traffic panel relative to the other symbols so as to correspond to the actual, relative positions of the ground obstacles and features. Alternatively, the own ship symbol may not appear on the ground traffic panel when the pilot's aircraft is not in the ground area being depicted.

In one aspect, the ground obstacles are other aircraft and the ground features include any one of runways, taxiways, ramps or gates at an airport. The other aircraft represented by traffic symbols are those within a predetermined distance of one of the ground features. For instance, the traffic symbols represent aircraft within 500 feet of a destination runway.

In yet another embodiment, the present invention includes a method of changing a graphical interface to switch between displaying a single traffic graphical panel and simultaneously displaying both air and ground traffic graphical panels. A plurality of obstacle symbols, each corresponding to an obstacle, and an own ship symbol corresponding to a pilot's aircraft, are displayed on the single traffic graphical panel. The symbols are positioned relative to each other such that the obstacle symbols correspond to the actual, relative positions of the obstacles and the own ship symbol corresponds to the pilot's aircraft. In response to detection of a triggering event, a plurality of air and ground traffic symbols are displayed on the air and ground traffic graphical panels, respectively. The own ship symbol may also be displayed on the air and ground traffic panels. The symbols are positioned relative to each other such that the obstacle symbols correspond to the actual, relative positions of the obstacles and the own ship symbol corresponds to the actual position of the pilot's aircraft.

Various events may be used to trigger a switch between display of a single panel and multiple panels. Examples of such events are listed below:

1. Own Ship track alignment within ±20° of a selected runway heading and within 5 nm of runway landing threshold and landing gear is down.
2. Activation of a toggle switch by the pilot.
3. Descent or ascent of the aircraft through a predetermined altitude, such as 1000 or 2000 feet above ground level.
4. Upon command or information from a flight management or navigation system when it is determined an approach has been missed.
5. Deployment of the aircraft's landing gear for landing, or retraction of the landing gear on takeoff.
6. Within a threshold distance before a final approach fix during landing.
7. Diversion or deviation of the aircraft from a predetermined course, such as deviation from a substantially straight trajectory.
8. Tolling of an amount of time, preferably about 3 minutes, before a landing approach must be missed, such as for changing from split to single air traffic display panel. (The amount of time to the missed approach point may be calculated using a distance to the approach point and the speed of the pilot's aircraft relative to the ground.)

Generally, the triggering event switches from the single panel to the multiple panel display on landing and from the multiple panel to single panel display on takeoff, or on missed approach.

Advantageously, the provision of ground traffic information on the ground traffic panel allows the pilot to detect aircraft on runways, and other ground obstacles. Detection of other aircraft and obstacles allows the pilot to avoid those obstacles, resulting in increased safety. Simultaneous display of the air traffic panel with the ground traffic panel prior to, and during, landing allows the pilot to peek ahead at the conditions of the runway and airport. Similarly, when the Own Ship is on the ground, the display allows the pilot to avoid potential collisions. Automatic switching between single and double panel display allows the pilot to focus on other tasks during takeoff or landing, such as manually controlling the airplane.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As will be appreciated by one skilled in the art, the present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. Any suitable computer-readable storage medium may be utilized including hard-disks, CD-ROMS, optical storage devices, or magnetic storage devices.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
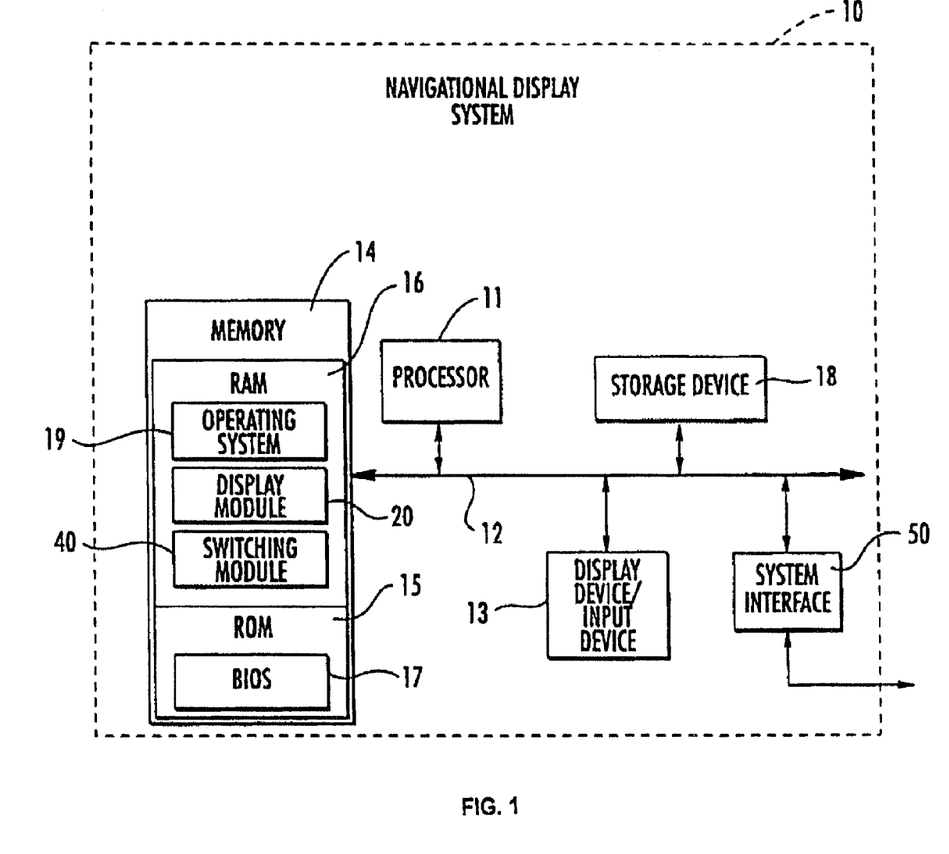
FIG. 1 is a schematic diagram of a navigational display system of one embodiment of the present invention.

A navigational display system 10 of one embodiment of the present invention is shown in FIG. 1. As understood by those of skill in the art, the navigational display system is preferably configured for use within the flight deck of an aircraft (i.e., the "Own Ship" aircraft). However, in alternative embodiments of the invention, the navigational display system 10 may be configured to operate in a location that is remote from the Own Ship aircraft. For example, the navigational display system 10 may be positioned at a ground station, and may be configured to transmit information for display on a display screen within the flight deck of the Own Ship aircraft.

The navigational display system 10 includes a processor 11 that communicates with other elements within the navigational display system via a system interface or bus Also included in the navigational display system 10 is a display device/input device 13 for receiving and displaying data. The display device/input device may be, for example, a keypad or pointing device that is used in combination with a display screen. Further, the display device/input device 13 may include speakers or other devices for providing aural alerts. The navigational display system 10 further includes memory 14, which preferably includes both read only memory (ROM) 15 and random access memory (RAM) 16. The ROM 15 is used to store a basic input/output system (BIOS) 17, containing the basic routines that help to transfer information between elements within the navigational display system 10.

In addition, the navigational display system 10 includes at least one storage device 18, such as a hard disk drive, a floppy disk drive, a CD-ROM drive, or optical disk drive, for storing information on various computer-readable media, such as a hard disk, a removable magnetic disk, or a CD-ROM drive, or optical disk drive, for storing information on various computer-readable media, such as a hard disk, a removable magnetic disk, or a CD-ROM disk. As will be appreciated by one of ordinary skill in the art, each of these storage devices 18 is connected to the system bus 12 by an appropriate interface. The storage devices 18 and their associated computer-readable media provide non-volatile storage for the navigational display system 10. It is important to note that the computer-readable media described above could by replaced by any other type of computer readable media known in the art. Such media include, for example, magnetic cassettes, flash memory cards and digital video disks.

A number of program modules may be stored by the various storage devices, such as within RAM 16 (as shown in FIG. 1) or within the storage device 18 (as not shown for clarity). Such program modules include an operating system 19, a navigational split-screen display module 20 and a switching module 40. The switching and display modules control certain aspects of the operation of the navigational display system 10, as is described in more detail below, with the assistance of the processor 11 and the operating system 19.

Also located within the navigational display system 10, is a system interface 50 for interfacing and communicating with other elements of the aircraft's navigational system. It will be appreciated by one of ordinary skill in the art that one or more of the navigational display system's components may be located geographically remotely from other navigational display system components. Furthermore, one or more of the components may be combined, and additional components performing functions described herein may be included in the navigational display system.

A system according to one embodiment of the present invention includes a graphical user interface 21 having one, or more, graphical panels depicting ground traffic information; or a combination of air and ground traffic information. The term graphical user interface is used herein to describe visible, electronic representations of various data such as symbols, text, colors, pictures and tables on a screen, such as the display device 13, monitor, or other visibly detectable electronic output device. Graphical or display panels are subdivisions of the graphical user interface, wherein each graphical panel includes its own collection of the electronically represented data. Typically, the data grouped within each panel are directed toward a common purpose and the panel itself is a contiguous portion of the overall graphical user interface.

Figure 2:
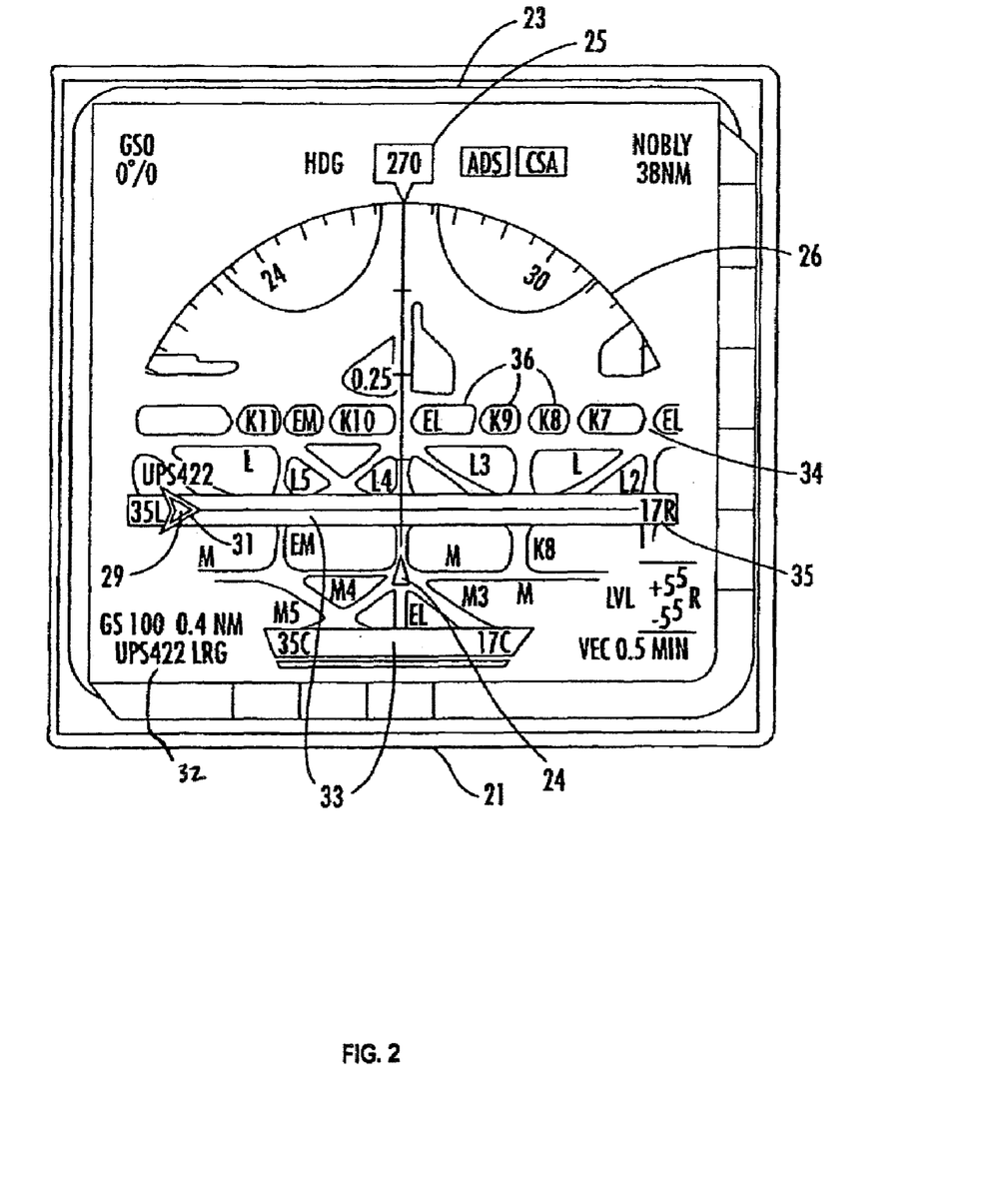
FIG. 2 is a graphical user interface of one embodiment of the present invention.

As illustrated in FIG. 2, the graphical user interface 21 of one embodiment includes a ground traffic graphical panel 23 having symbolic and alphanumeric information establishing the position, velocity, heading and other navigational information of the Own Ship and other obstacles, navigational features and landmarks on the ground. For instance, the ground traffic graphical panel 23 includes an own ship symbol 24 and a current heading indicator 25. The own ship symbol 24 has a triangular shape in this embodiment the apex of the triangle corresponds to the position and heading of the nose of the Own Ship aircraft.

Preferably, the position of the own ship symbol 24 is fixed in the lower, center of the graphical panel 23 and its orientation is indicated by the heading indicator 25. For example, a ground traffic graphical panel 23 that uses a heading up orientation will show the heading indicator referencing the current heading of the Own Ship on a compass rose 26 that slides under the heading indicator as the heading changes. The compass rose 26 moves with respect to the own ship symbol 24, and a line extending between the symbol and heading indicator 25 (which has a fixed position), to indicate changes in the path of the Own Ship aircraft.

Heading as used herein defines the orientation of the nose of the aircraft while track is the direction that the aircraft is moving. Notably, on the ground the heading and track tend, to be the same due to the inability of the aircraft to "crab," or move sideways with respect to its nose, such as occurs during a cross-wind when the aircraft is airborne. As an alternative to the compass rose on the ground traffic graphical panel 23, the orientation may be fixed, such as in an orientation wherein North is up, and the own ship symbol 24 is moved within the panel to indicate changes in position and orientation.

Also displayed are symbols representing ground features and obstacles, including runways 33 and taxiways 34 at an airport. Preferably, the runways are shown without centerlines and with labels 35 and numbers shown in a top up fashion so as to be more readable. Runways are also preferably shown without areas that extend beyond the normally useable parts of the runway. The taxiways 34 may also include labels 36 that are shown in a top up, readable fashion. Although not shown, when a taxiway crosses a runway, the label for it can be shown on both sides of the runway. Other examples of obstacles and features not shown in FIG. 2 include ramps, gates, terminals and buildings at the airport. Gate names could also be shown using labels, however, the size of the labels may be constrained to minimize clutter. In the illustrated embodiment, a "top-down" view of the ground is shown, but other views could also be used, such as an adjustable perspective view. The view could also be adjustable by zooming into or out of areas of interest.

The ground traffic graphical panel 23 preferably further includes one or more aircraft symbols 29 that correspond to the position of other aircraft on the ground, such as on an adjacent runway of the same airport. Generally, the ground traffic will be shown when it appears either on one of the runways (especially where runways intersect) or within about 500 feet of the runway. This distance may also be greater for increased safety such as within 1000 feet of the runway. However, all aircraft could be represented by symbols 29, if desired. Other mobile airport vehicles could also be shown, such as towing vehicles, luggage carrying vehicles and fueling vehicles. Use of symbols to show other vehicles and aircraft is especially preferred when the own ship is on the ground.

Additional information may be provided on one of the aircraft if its corresponding one of the aircraft symbols 29 is selected, as indicated by an outline 31. The pilot can toggle through the aircraft symbols using the input device 13 and as each of the symbols is outlined, its corresponding ground-speed, distance and other additional information appear in a supplementary information field 32 on the lower left-hand corner of the air traffic panel 22. For example, in FIG. 2, the information field 32 in the lower left-hand corner of the ground traffic panel 23 displays information related to the aircraft 29 currently chosen by the pilot and highlighted by outline 31. Although the illustrated embodiment depicts aircraft as the only airborne obstacles, other obstacles could also be indicated such as dirigibles.

Various brightness, colors and visual effects may be employed to establish contrasts between different symbols and information on the ground traffic graphical panel 23. Preferably, white is used for runways 33, taxiways 34 and ramps. Runways 33 that have been selected by the pilot are outlined in green or magenta. Fill for the runways 33 is preferably gray and fill for the taxiways 34 and ramps is black. Non-aircraft use areas are shown in dark green or olive drab, including dirt, grass, buildings, etc. Optionally, buildings can be displayed as a separate obstacle or structure. Hold lines and alerted runways 33 are shown in yellow. Hold lines are lines behind which an aircraft should stay when stopping short of an occupied runway and alerted runways are those runways that are occupied. Alternatively, fill in for taxiways 34 and ramps may be white. Other colors could also be used. Excessive amounts of white color, however, is generally avoided so as to not excessively illuminate the flight deck and distract the pilots.

Although the various data used to generate the displays may come from different sources, preferably the runway data is stored in a database card that is connected to the display system 10. The traffic data is dynamic data that is processed from a datalink receiver that is capable of receiving traffic reports from ADS-B, TIS-B, or both. ADS-B is a broadcast technology where aircraft transmit their location and identity so that like-equipped aircraft can receive and process the information. TIS-B is a traffic information broadcast system where ground sensors interrogate transponders on aircraft to identify the location of the aircraft.

Figure 3:
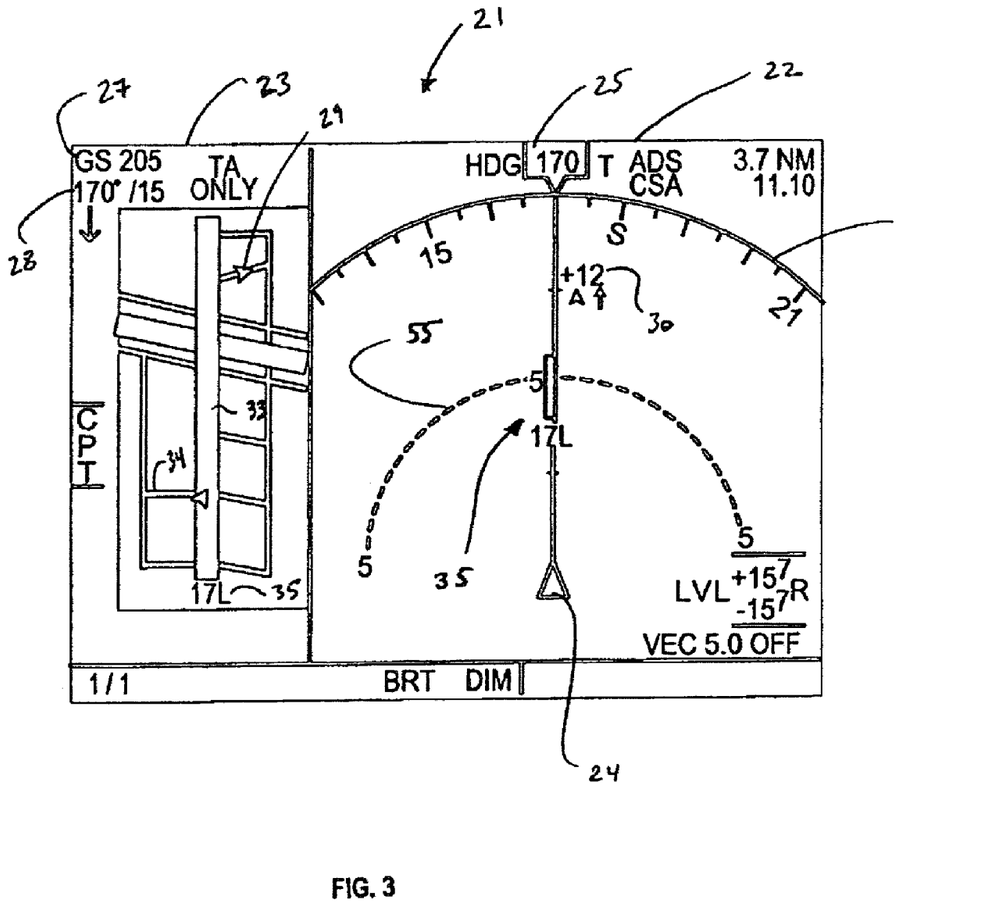
FIG. 3 is a graphical user interface of another embodiment of the present invention including a ground and air traffic graphical panels.

As illustrated in FIG. 3, another embodiment the graphical user interface 21 can include an air traffic graphical panel 22 and another ground traffic graphical panel 23 positioned horizontally adjacent to each other. Generally then, the runway representation in FIG. 3 illustrates the correlation between the longer-range airborne traffic display and the "peek ahead" of the runway environment. The ground traffic panel 23 occupies the left one-third of the graphical user interface 21, while the air traffic graphical panel 22 occupies the right two-thirds of the graphical user interface. Such positioning enables a pilot, or other user, to examine both panels 22, 23 in a single, horizontal visual scan. However, the panels could be presented in other, non-adjacent relationships, and other relative positions and proportions, such as being vertically adjacent and each one-half of the graphical user interface. Further, although each of the panels 22, 23 is represented as a contiguous, rectangular panel, each of the panels need not have a particular shape, and can even be distributed across the graphical user interface 21 in separate portions.

Similar to the ground traffic graphical panel 23 of the embodiment described above, the air traffic graphical panel 22 includes symbolic and alphanumeric information establishing the position, velocity, heading and other navigational information of the airborne Own Ship and other airborne obstacles, such as other aircraft. Examples of alphanumeric information associated with the air traffic graphical panel 22 include a ground speed listing 21 and an air speed and direction indicator 28 in the upper left hand corner of the graphical user interface 21 (within the ground panel 23 in the illustrated embodiment of FIG. 3, but it can also be within the air panel 22, if desired).

Airborne obstacles include other aircraft which are indicated in this embodiment by chevron-shaped aircraft symbols 29 each oriented to correspond to the heading of its respective aircraft. In addition, alphanumeric aircraft information 30 can be displayed that is associated with, and preferably adjacent to, each of the aircraft symbols 29. The aircraft information 30 can include such information as an identification code for the aircraft, a climb or descent rate, or a closure rate indicating the rate at which the aircraft is approaching or receding from the Own Ship aircraft. Optionally, the closure rate may only be shown for selected aircraft under conditions where such information is useful. For instance, when behind the aircraft and traveling roughly the same track.

Figure 4:
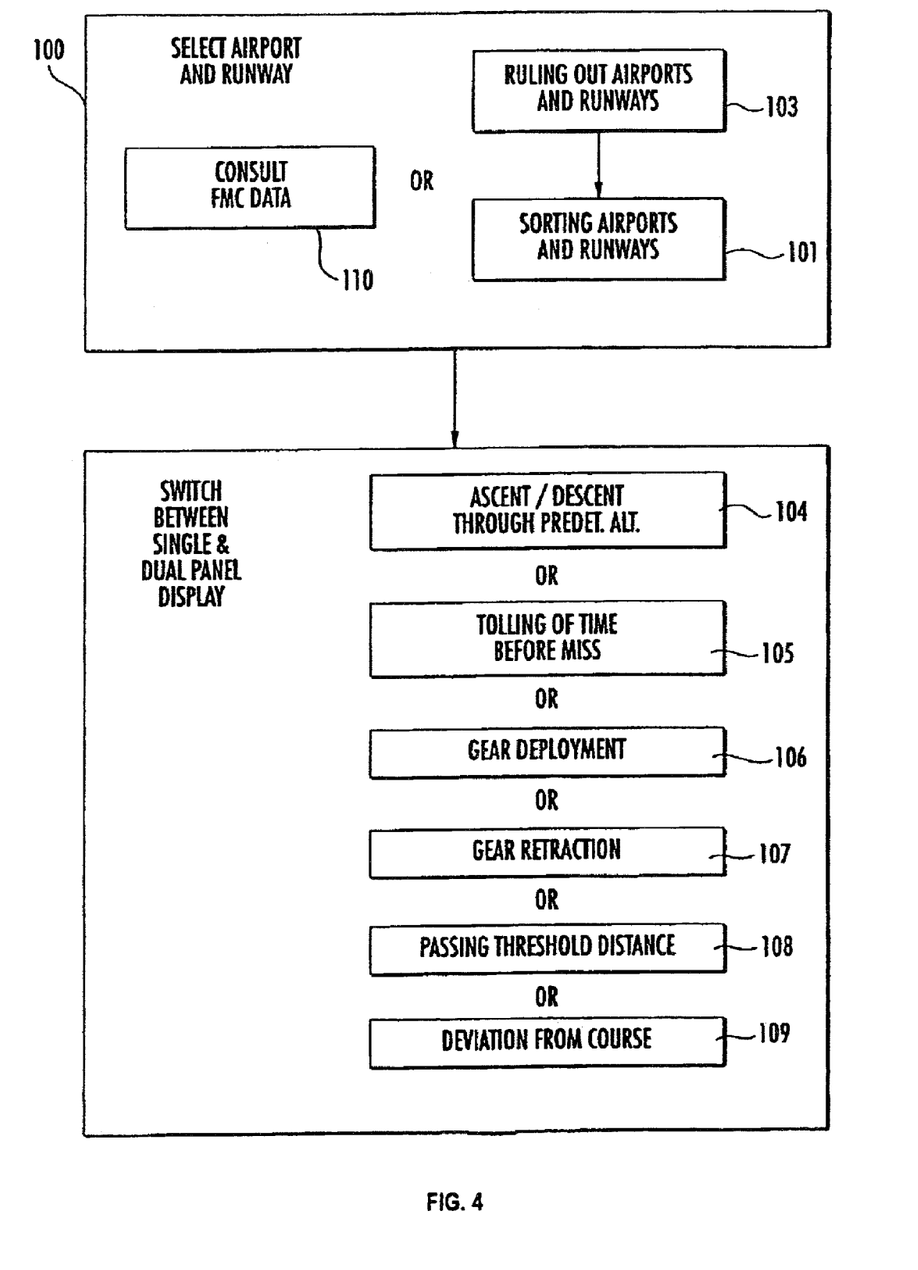
FIG. 4 is a flowchart of a method of switching between single and dual panel display of the present invention.

As shown in FIG. 4, yet another embodiment of the present invention includes method of changing a graphical interface to switch between displaying a single air traffic graphical panel, such as the ground traffic panel 22, and simultaneously displaying both air and ground traffic graphical panels 22, 23, as shown in FIG. 3. Prior to landing, the system 10 determines 100 the airport and runway upon which the aircraft is to land. The runway may be selected manually, through the keypad or other input device 13. Manual airport selection can be aided by sorting 101 of the airports based on nearness to a position, such as a current position of the Own Ship aircraft. Various runways and airports may also be ruled out 103 by the system 10 based on runway length, weight restrictions which are correlated to the type of Own Ship aircraft. Information about the airports into which various types of aircraft can fly is preferably stored in a data card file on the storage device 18. Alternatively, the airport and runway may be entirely determined automatically using flight management control data, such as from a flight management system, wherein the destination airport is selected 110.

Switching between a single air traffic graphical panel 22 to a shared display of air and ground traffic panels 22,23 can be triggered by a predetermined event or by use of a toggle switch controlled by the pilot In the ease of predetermined event triggers, various events may be used to trigger split screen display. Examples of triggering events are listed below:

1. Own Ship track alignment within ±20° of a selected runway heading and within 5 nm of runway landing threshold and landing gear is down.
2. Activation of a toggle switch by the pilot.
3. Descent or ascent 104 of the aircraft through a predetermined altitude, such as 1000 or 2000 feet above ground level.
4. Upon command or information from a flight management or navigation system when it is determined an approach has been missed.
5. Deployment 106 of the aircraft's landing gear for landing, or retraction 107 of the landing gear on takeoff.
6. Within a threshold distance before a final approach fix during landing.
7. Diversion or deviation 109 of the aircraft from a predetermined course, such as deviation from a substantially straight trajectory.
8. Tolling of an amount of time 105, preferably about 3 minutes, before a landing approach must be missed, such as for changing from split to single air traffic display panel. (The amount of time to the missed approach point may be calculated using a distance to the approach point and the speed of the pilot's aircraft relative to the ground.)

These are just a few examples of the possible event triggers. Further, generally, the triggering event switches from the single air traffic panel 22 to displaying both the air and ground traffic panels 22, 23 as the Own Ship aircraft approaches the runway, or the reverse as the Own Ship aircraft leaves the runway.

An automatic zoom feature is preferably available as another aspect of the present invention. The automatic zoom feature scales the range of at least one of the panels 22 in response to several factors, such as whether the Own Ship is airborne or whether the airport and runway are selected. A range scale 55, which is preferably annunciated at all times, is the distance from the own ship symbol 24 and the compass rose 26. Alternatively, the range scale 55 may also show the half-way distance from the own ship symbol to the compass rose. Preferred sets of range (in nautical miles) include a first set at ⅛, ¼, ½, 1, 2.5, 5, 10, 25, 50, 100 and 300; and a second set at ⅛, ¼, ½, 1, 2.5, 5, 10, 20, 40, 80, 160 and 320. As the scale changes, various labels and symbols may be removed from the panels 22, 23 for clarity or merely because they are no longer in range.

Examples of instances where the zoom scale may be increased automatically including on a downwind leg wherein the runway is abeam the aircraft at distances between 1 and 2 nautical miles. If the downwind leg is extended, the runway may get as far as 4 to 5 nautical miles aft of the Own Ship aircraft. Once re-established on final approach, the automatic zoom preferably scales back down to where the runway is shown on the display. Automatic zoom will preferably still be active when these conditions apply, even during a missed approach. The scale may also be automatically increased upon takeoff of the Own Ship aircraft.

Detection of various triggers for changing the display format, color and type of panels can also be expanded to detection of other events, especially those having an impact on safety. For instance, occupancy of runways about to be crossed could be indicated by flashing' of the runway symbol 33 or the aircraft symbol 29. Such visual warnings could be coordinated with aural alerts of runway occupancy. These alerts could also be coupled with aural and visual maneuver instructions that guide the crew of the Own Ship aircraft in their decisions to avoid the unsafe situation.

Advantageously, the provision of ground traffic information on the ground traffic panel 23 allows the pilot to detect aircraft on runways, and other ground obstacles. Detection of other aircraft and obstacles allows the pilot to avoid those obstacles, resulting in increased safety. Simultaneous display of the air traffic panel 22 with the ground traffic panel 23 prior to, and during, landing allows the pilot to peek ahead at the conditions of the runway and airport. Similarly, when the Own Ship is on the ground, the display allows the pilot to avoid potential collisions. Automatic switching between single and double panel display allows the pilot to focus on other tasks during takeoff or landing, such as manually controlling the airplane.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they arc used in a generic and descriptive sense only and not for purposes of limitation.

That which is claimed:

1. A navigational display system characterized by:
    displaying a single graphical traffic panel that depicts at least one of air and ground traffic;
    displaying both an air graphical traffic panel and a ground graphical traffic panel; and
    switching between displaying the single graphical traffic panel and simultaneously displaying both air and ground graphical traffic panels, in response to a triggering event.

2. The navigational display system as set forth in claim 1, wherein traffic symbols and an own ship symbol are displayed on the graphical panels relative to each other such that the traffic symbols correspond to relative positions of traffic with respect to an own ship.

3. The navigational display system as set forth in claim 2, wherein at least one of an altitude and a velocity is displayed for each traffic symbol.

4. The navigational display system as set forth in claim 1, wherein the triggering event is at least one of ascending through a predetermined altitude and descending through a predetermined altitude.

5. The navigational display system as set forth in claim 1, wherein the triggering event is input from a pilot of an own ship.

6. The navigational display system as set forth in claim 1, wherein the triggering event is selected from the group consisting of:
- track alignment within a predetermined angle of a selected runway heading,
- within a predetermined distance of a runway landing threshold,
- input from a pilot,
- descent through a predetermined altitude,
- ascent through a predetermined altitude,
- deployment of landing gear,
- retraction of landing gear,
- within a predetermined distance of a final approach fix during landing,
- deviation from a predetermined course, and
- tolling of predetermined time before a landing approach must be missed.

7. The navigational display system as set forth in claim 1, wherein the triggering event comprises:
- track alignment within a predetermined angle of a selected runway heading, and
- within a predetermined distance of a runway landing threshold.

8. The navigational display system as set forth in claim 7, wherein the triggering event further comprising deployment of an own ship's landing gear.

9. The navigational display system as set forth in claim 1, wherein the triggering event comprises:
- descent of an own ship through a predetermined altitude, and
- deployment of the own ship's landing gear.

10. The navigational display system as set forth in claim 1, wherein the triggering event comprises:
- ascent of an own ship through a predetermined altitude, and
- retraction of the own ship's landing gear.

11. A navigational display system comprising:
- a display device;
- a processor for controlling the display for providing traffic information to a pilot of an aircraft; and
- wherein the processor causes the display to display a plurality of symbols representative of airborne traffic on a first graphical panel, symbols representative of ground traffic on a second graphical panel, and a symbol representative of the pilot's aircraft on at least one of the first and second panels.

12. The navigational display system as set forth in claim 11, wherein at least one of the first and second panels is further configured to display obstacles in proximity to the pilot's aircraft.

13. The navigational display system as set forth in claim 12, wherein at least one of the first and second panels is further configured to display at least one of an altitude and a velocity of the displayed traffic.

14. The navigational display system as set forth in claim 11, wherein the processor is configured to cause the display to display only one of the first and second graphical panels.

15. The navigational display system as set forth in claim 14, wherein the processor is configured to cause the display to switch between displaying only one of the first and second graphical panels and simultaneously displaying both the first and second graphical panels, in response to a triggering event.

16. The navigational display system as set forth in claim 15, wherein the triggering event is selected from the group consisting of:
- track alignment within a predetermined angle of a selected runway heading,
- within a predetermined distance of a runway landing threshold,
- input from a pilot,
- descent through a predetermined altitude,
- ascent through a predetermined altitude,
- deployment of landing gear,
- retraction of landing gear,
- within a predetermined distance of a final approach fix during landing,
- deviation from a predetermined course, and
- tolling of predetermined time before a landing approach must be missed.

17. The navigational display system as set forth in claim 15, wherein the triggering event comprises:
- track alignment within a predetermined angle of a selected runway heading, and
- within a predetermined distance of a runway landing threshold.

18. The navigational display system as set forth in claim 17, wherein the triggering event further comprising deployment of an own ship's landing gear.

19. The navigational display system as set forth in claim 15, wherein the triggering event comprises:
- descent of an own ship through a predetermined altitude, and
- deployment of the own ship's landing gear.

20. The navigational display system as set forth in claim 15, wherein the triggering event comprises:
- ascent of an own ship through a predetermined altitude, and
- retraction of the own ship's landing gear.

* * * * *